(12) United States Patent
Glickman et al.

(10) Patent No.: US 10,543,777 B2
(45) Date of Patent: Jan. 28, 2020

(54) EXTERIOR COMPARTMENT LIGHT

(71) Applicant: FORD GLOBAL TECHNOLOGIES, LLC, Dearborn, MI (US)

(72) Inventors: David Brian Glickman, Southfield, MI (US); Paul Kenneth Dellock, Northville, MI (US); Stuart C. Salter, White Lake, MI (US); Jim J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 15/634,467

(22) Filed: Jun. 27, 2017

(65) Prior Publication Data
US 2018/0370422 A1 Dec. 27, 2018

(51) Int. Cl.
E06B 3/00 (2006.01)
B60Q 1/30 (2006.01)
B60Q 1/26 (2006.01)
E05B 85/10 (2014.01)
H05B 33/08 (2006.01)

(52) U.S. Cl.
CPC ............ *B60Q 1/30* (2013.01); *B60Q 1/2669* (2013.01); *E05B 85/107* (2013.01); *H05B 33/0845* (2013.01); *H05B 33/0857* (2013.01); *B60Q 2400/20* (2013.01)

(58) Field of Classification Search
CPC .... B60Q 1/30; B60Q 1/2669; B60Q 2400/20; H05B 33/0845; H05B 33/0857; E05B 85/107

USPC .......................................................... 49/503
See application file for complete search history.

(56) References Cited

U.S. PATENT DOCUMENTS

| 4,714,983 | A | * | 12/1987 | Lang | .................... | G02B 6/0021 |
| | | | | | | 349/65 |
| 5,005,108 | A | * | 4/1991 | Pristash | ............... | G02B 6/0005 |
| | | | | | | 362/23.15 |
| 5,895,115 | A | * | 4/1999 | Parker | .................. | B60Q 1/0082 |
| | | | | | | 362/244 |
| 6,175,300 | B1 | * | 1/2001 | Kendrick | ............. | B60Q 1/0023 |
| | | | | | | 340/435 |
| 6,369,395 | B1 | | 4/2002 | Roessle | | |
| 6,390,529 | B1 | | 5/2002 | Bingle et al. | | |

(Continued)

FOREIGN PATENT DOCUMENTS

DE 10157709 6/2003
FR 2943028 9/2010

*Primary Examiner* — Jerry E Redman
(74) *Attorney, Agent, or Firm* — Vichit Chea; Carlson, Gaskey & Olds, P.C.

(57) ABSTRACT

An apparatus, according to an exemplary aspect of the present disclosure includes, among other things, a handle movable relative to a vehicle closure panel between an active mode and a stowed mode, and an illumination source incorporated into the handle. The illumination source illuminates the handle when in the active mode and illuminates a cargo area associated with the vehicle closure panel when in the stowed mode with the closure panel open. A method according to an exemplary aspect of the present disclosure includes, among other things, moving the handle relative to the vehicle closure panel between the active and stowed modes, illuminating the handle when in the active mode, and illuminating the cargo area when in the stowed mode.

23 Claims, 2 Drawing Sheets

(56) References Cited

U.S. PATENT DOCUMENTS

| | | | | |
|---|---|---|---|---|
| 6,509,832 B1* | 1/2003 | Bauer | B60Q 1/0023 | 340/425.5 |
| 6,692,056 B2* | 2/2004 | Bingle | E05B 83/26 | 292/336.3 |
| 6,783,167 B2* | 8/2004 | Bingle | E05B 83/26 | 292/DIG. 43 |
| 6,832,793 B2* | 12/2004 | Bingle | E05B 83/26 | 180/271 |
| 6,929,294 B2 | 8/2005 | Byria et al. | | |
| 7,336,980 B1* | 2/2008 | Kaikuranta | H04M 1/0283 | 455/344 |
| 7,556,412 B2* | 7/2009 | Guillermo | A42B 3/044 | 362/551 |
| 7,712,933 B2* | 5/2010 | Fleischmann | B60Q 1/2696 | 362/495 |
| 8,088,066 B2* | 1/2012 | Grey | A61B 17/02 | 600/212 |
| 8,172,440 B2* | 5/2012 | Aulakh | B60Q 1/302 | 362/496 |
| 8,408,773 B2* | 4/2013 | Judge | B60Q 1/2696 | 362/605 |
| 8,409,088 B2* | 4/2013 | Grey | A61B 17/02 | 600/212 |
| 8,698,894 B2* | 4/2014 | Briggance | B60R 11/04 | 348/148 |
| 8,830,324 B2* | 9/2014 | Endo | B60Q 1/0023 | 348/149 |
| 8,964,032 B2* | 2/2015 | McElroy | B60Q 1/143 | 348/148 |
| 9,022,631 B2* | 5/2015 | Mulder | G02B 6/006 | 362/601 |
| 9,227,565 B2* | 1/2016 | Sura | B60Q 3/82 | |
| 9,556,648 B2* | 1/2017 | Gardner | E05B 85/045 | |
| 9,606,255 B2* | 3/2017 | Sieg | B60R 25/2054 | |
| 9,802,553 B2* | 10/2017 | Sura | B60K 35/00 | |
| 9,862,309 B2* | 1/2018 | Oliverio | F21S 43/237 | |
| 9,879,451 B2* | 1/2018 | Muller | E05B 85/107 | |
| 2006/0104075 A1* | 5/2006 | Misawa | B60Q 1/2669 | 362/501 |
| 2006/0274539 A1* | 12/2006 | Chou | B60Q 1/2669 | 362/459 |
| 2007/0086201 A1* | 4/2007 | Wang | B60Q 1/2669 | 362/501 |
| 2007/0206388 A1* | 9/2007 | Misawa | B60Q 1/2669 | 362/501 |
| 2007/0258258 A1* | 11/2007 | Wang | B60Q 1/2669 | 362/501 |
| 2009/0129105 A1* | 5/2009 | Kusu | B60Q 1/2669 | 362/464 |
| 2009/0147528 A1* | 6/2009 | Wang | B60Q 1/2669 | 362/501 |
| 2009/0279826 A1* | 11/2009 | Ieda | B60Q 1/2669 | 385/13 |
| 2010/0077805 A1* | 4/2010 | Mueller | B60Q 1/2669 | 70/91 |
| 2010/0321946 A1* | 12/2010 | Dingman | B60Q 1/2665 | 362/501 |
| 2011/0148575 A1* | 6/2011 | Sobecki | E05B 85/103 | 340/5.64 |
| 2012/0106182 A1* | 5/2012 | Minter | B60Q 1/2669 | 362/501 |
| 2012/0128344 A1* | 5/2012 | Kwon | E05B 81/06 | 396/429 |
| 2012/0247161 A1* | 10/2012 | Muller | E05B 85/107 | 70/91 |
| 2013/0130674 A1* | 5/2013 | De Wind | B60Q 1/2619 | 455/420 |
| 2016/0075277 A1* | 3/2016 | Salter | B60Q 3/30 | 362/464 |
| 2016/0305164 A1* | 10/2016 | Bendel | E05B 77/02 | |
| 2017/0072848 A1 | 3/2017 | Salter et al. | | |
| 2017/0120811 A1* | 5/2017 | Salter | B60R 7/02 | |
| 2017/0129396 A1* | 5/2017 | Salter | A61L 2/088 | |
| 2017/0240033 A1* | 8/2017 | Dylewski, II | B60J 7/141 | |
| 2017/0246986 A1* | 8/2017 | Imai | B60Q 1/2669 | |
| 2018/0136027 A1* | 5/2018 | Demski | G01F 23/0007 | |

* cited by examiner

EXTERIOR COMPARTMENT LIGHT

TECHNICAL FIELD

This disclosure relates to an exemplary apparatus and method of providing a handle for a vehicle closure panel, the handle including an illumination source and being movable relative to the closure panel between active and stowed modes such that the handle is illuminated when in the active mode and the cargo area is illuminated when in the stowed mode.

BACKGROUND

Vehicles include various compartments that are accessible from outside the vehicle such as an engine compartment or trunk, for example. For electric drive vehicles, an additional area normally occupied by a vehicle engine is available for added cargo space under a hood or other closure panel. It is important to be able to latch and unlatch such a closure panel in an efficient manner Additionally, it is important to be able to see clearly into the compartment during both day and night.

SUMMARY

An apparatus according to an exemplary aspect of the present disclosure includes, among other things, a handle movable relative to a vehicle closure panel between an active mode and a stowed mode, and an illumination source incorporated into the handle. The illumination source illuminates the handle when in the active mode and illuminates a cargo area associated with the vehicle closure panel when in the stowed mode with the closure panel open.

In a further non-limiting embodiment of the foregoing apparatus, the illumination source illuminates a first color when in the active mode and a second color different than the first color when in the stowed mode.

In a further non-limiting embodiment of either of the foregoing apparatus, the illumination source illuminates a third color different than the first and second colors when the closure panel covers the cargo area and is properly latched.

In a further non-limiting embodiment of any of the foregoing apparatus, the illumination source has a first intensity when in the active mode and a second intensity different than the first intensity when in the stowed mode.

In a further non-limiting embodiment of any of the foregoing apparatus, the handle has an exterior surface that is flush with the vehicle closure panel in the stowed mode and an interior surface that supports the illumination source.

In a further non-limiting embodiment of any of the foregoing apparatus, the apparatus includes a printed circuit board mounted to the interior surface and electrically connected to the illumination source.

In a further non-limiting embodiment of any of the foregoing apparatus, the printed circuit board includes an orientation sensor communicating with the illumination source to change color and/or intensity of the illumination source for the stowed and active modes.

In a further non-limiting embodiment of any of the foregoing apparatus, the apparatus includes a hinge connection that couples the handle to the vehicle closure panel, the hinge connection including electrical connections to couple the printed circuit board to a power source.

An apparatus according to another exemplary aspect of the present disclosure includes, among other things, a vehicle closure panel movable between an open position to provide access to a cargo area and a closed position to cover the cargo area, a handle movable relative to the vehicle closure panel between an active mode and a stowed mode, and an illumination source incorporated into the handle and illuminating the handle when in the active mode and illuminating the cargo area when in the stowed mode with the closure panel open.

In a further non-limiting embodiment of any of the foregoing apparatus, the handle is flush with the vehicle closure panel when in the stowed mode and is pivoted upwardly relative to the vehicle closure panel when in the active mode.

In a further non-limiting embodiment of any of the foregoing apparatus, the illumination source illuminates a first color when the closure panel is in the open position the handle is in the stowed mode, and wherein the illumination source illuminates a second color when the closure panel is in the open position and the handle is in the active mode.

In a further non-limiting embodiment of any of the foregoing apparatus, the illumination source has a first intensity when in the stowed mode and a second intensity lower than the first intensity when in the active mode.

In a further non-limiting embodiment of any of the foregoing apparatus, the illumination source illuminates a third color when the closure panel is in the closed position and the handle is in the active mode.

In a further non-limiting embodiment of any of the foregoing apparatus, the handle has an exterior surface that is flush with the vehicle closure panel in the stowed mode and an interior surface that supports the illumination source.

In a further non-limiting embodiment of any of the foregoing apparatus, the apparatus includes a printed circuit board mounted to the interior surface and electrically connected to the illumination source, and an orientation sensor communicating with the illumination source to change color and/or intensity of the illumination source for the stowed and active modes.

A method according to another exemplary aspect of the present disclosure includes the steps of, among other things: providing a handle with an illumination source; moving the handle relative to a vehicle closure panel between an active mode and a stowed mode; illuminating the handle when in the active mode; and illuminating a cargo area associated with the vehicle closure panel when in the stowed mode.

In a further non-limiting embodiment of the foregoing method, the vehicle closure panel is movable between an open position to provide access to the cargo area and a closed position to cover the cargo area, and the method further includes: illuminating the illumination source as a first color when the closure panel is in the open position the handle is in the stowed mode; and illuminating the illumination source as a second color when the closure panel is in the open position and the handle is in the active mode.

In a further non-limiting embodiment of either of the foregoing methods, the method includes illuminating the illumination source as a third color when the closure panel is in the closed position and the handle is in the active mode, the third color indicating a securely latched closure panel.

In a further non-limiting embodiment of any of the foregoing methods, the method includes providing the illumination source with a first intensity when in the stowed mode and a second intensity different than the first intensity when in the active mode.

In a further non-limiting embodiment of any of the foregoing methods, the method includes providing the handle with an exterior surface that is flush with the vehicle closure panel in the stowed mode and mounting the illumination source to an interior surface of the handle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary apparatus and methods of moving a handle with an illumination source relative to a vehicle closure panel between active and stowed modes, such that the handle is illuminated when in the active mode, and the cargo area is illuminated when in the stowed mode.

Vehicles include various compartments that are accessible from outside the vehicle such as an engine compartment or trunk, for example. For electric drive vehicles, an additional area normally occupied by a vehicle engine is available for added cargo space under a hood or other closure panel. In one example, the cargo area comprises a bin that may be configured to have a sealed enclosure that is waterproof such that the bin could be used as a cooler that is capable of holding ice. In other examples, the bin may be used for general storage purposes or to hold additional vehicle equipment.

The bin thus provides a cargo area that is covered by a closure panel that moves between open and closed positions. Each bin, especially those located in a front of a vehicle at a hood location, includes a latch to securely lock the closure panel in place. It is also useful to be able to easily open and close the closure panel and to be able to see clearly into the cargo area. The subject invention provides a handle for the closure panel that incorporates an illumination source that can illuminate both the handle itself and the cargo area. This handle is shown in FIGS. 1-6 and is described in greater detail below.

Figure 1:
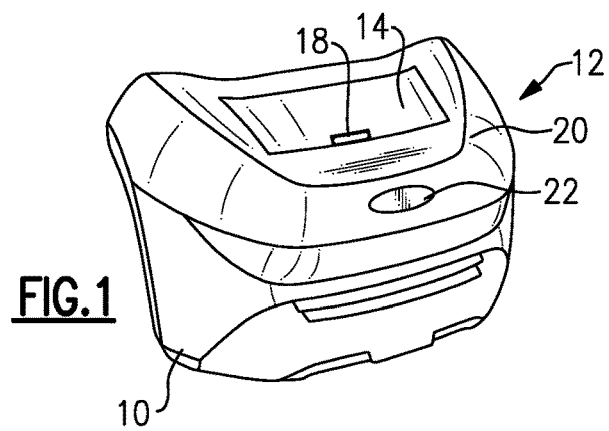
FIG. 1 schematically illustrates a front of a vehicle that includes a closure panel for a cargo area in a closed and latched position, the closure panel including a handle incorporating the subject invention.

FIG. 1 schematically illustrates a front 10 of a vehicle 12 that includes a closure panel 14 movable between an open position to provide access to a cargo area 16 (FIG. 2) and a closed position to cover the cargo area 16. FIG. 1 shows the panel 14 in a closed and securely latched position. The closure panel 14 includes a handle 18 that is movable relative to the vehicle closure panel between an active position or mode and a stowed position or mode. Each of these positions/modes will be discussed in greater detail below.

Figure 2:
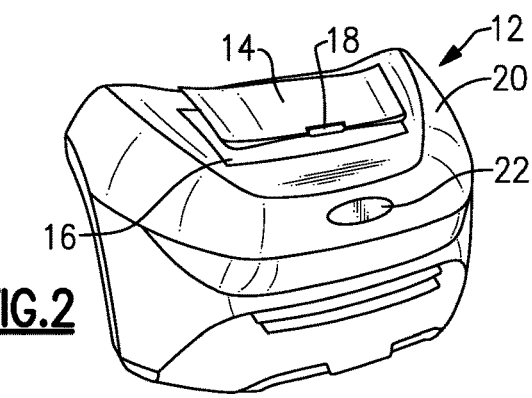
FIG. 2 is similar to FIG. 1 but shows the closure panel in an unlatched position and the handle in a stowed position.
Figure 3:
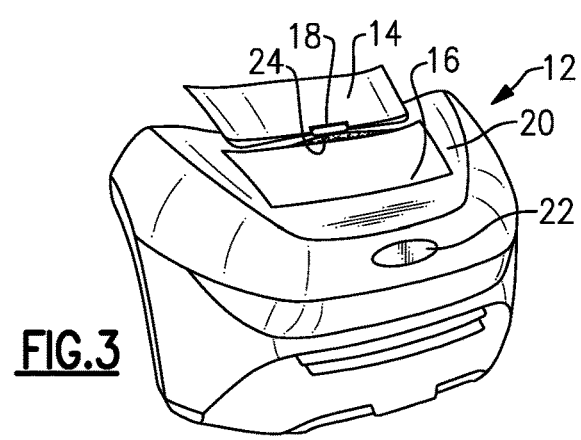
FIG. 3 is similar to FIG. 1 but shows the closure panel in an open position with the handle illuminating the cargo area while in the stowed position.

As shown in FIG. 1, when the closure panel 14 is in the closed and latched position, the handle 18 is flush with the closure panel 14 and is flush with a remaining portion of a hood 20 that surrounds the closure panel 14. Any type of latch can be used to latch the closure panel 14 to the hood 20. In one example, a manual release is activated by a user to unlatch the closure panel 14. In one example, a vehicle emblem 22 mounted to the hood 20 is pushed to release the closure panel 14 from the latched position. As shown in FIG. 2, when the emblem 22 is pushed, the closure panel automatically raises to a position away from the hood 20. The closure panel 14 then automatically slides rearward to the open position as shown in FIG. 3. Any type of mechanism can be used to automatically slide the panel 14 to the open position, such as a strut and 4-bar linkage (not shown) for example.

The handle 18 includes an illumination source 24. When the closure panel 14 is in the closed and latched position as shown in FIG. 1, the handle 18 is in a stowed mode where the handle 18 is flush with the hood 20 and panel 14. In one example, the illumination source 24 is off when the handle 18 is in the stowed position and the panel 14 is closed. FIG. 2 shows the closure panel 14 in an unlatched position and the handle 18 in a stowed mode with the illumination source 24 off as the panel 14 moves rearwardly to the open position.

Figure 4:
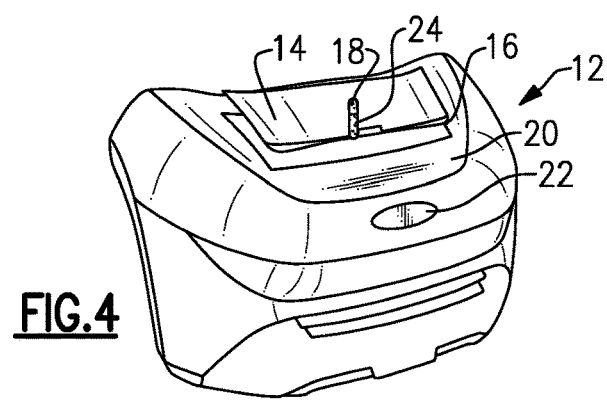
FIG. 4 is similar to FIG. 1 but shows the handle in an active position with the closure panel moving to the closed position.

FIG. 3 shows the closure panel 14 in the fully open position to provide full access to the cargo area 16. When the panel 14 moves into the fully open position, the illumination source 24 is automatically activated to illuminate the cargo area 16 while the handle 18 remains in the stowed position. When the user wishes to return the closure panel 14 to the closed position, the handle 18 is rotated away from the panel 14 to the active position as shown in FIG. 4. Once in this position, the illumination of the cargo area 16 is ceased and the handle 18 itself is illuminated such that the user can easily see the handle 18 to grab the handle 18 and pull the closure panel 14 back to the closed position.

Figure 5:
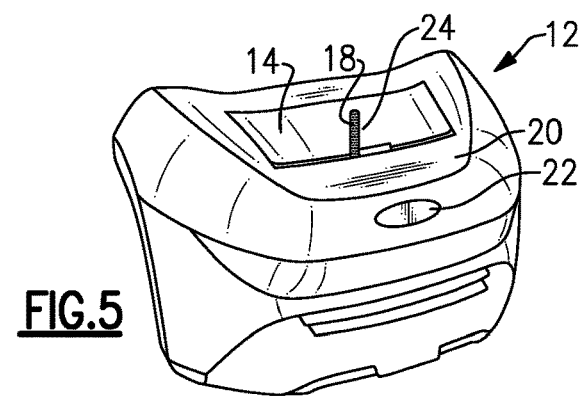
FIG. 5 is similar to FIG. 1 but shows the handle in an active position with the closure panel in the closed position and securely latched.

FIG. 5 shows the handle 18 in an active position with the closure panel 14 being in the closed position and securely latched. The closure panel 14 includes an "ajar switch" that is similar to a "door ajar switch" to identify when the closure panel 14 is not fully and securely latched. When the panel 14 is securely latched, the handle 18 is configured to provide an indicator to the user that the panel is properly latched such that the user can then return the handle 18 to the stowed position.

As discussed above, the handle 18 is flush with the closure panel 14 when in the stowed mode and is pivoted upwardly relative to the closure panel 14 when in the active mode. In one example, the illumination source 24 is a first color when the closure panel 14 is in the open position and the handle is in the stowed mode (FIG. 3), and the illumination source 24 is a second color when the closure panel 14 is in the open position and the handle 18 is in the active mode (FIG. 4). In one example, the first color is bright white to provide full illumination of the cargo area 16, and the second color is a different color such as red or blue so that the user can easily see the handle 18 to grab it and pull it to close the panel 14.

In another example, the illumination intensity can be varied either alone or in combination with the color variation. In one example, the illumination source 24 has a first intensity when the handle 18 is in the stowed mode and a second intensity different than the first intensity when the handle 18 is in the active mode. For example, when the handle 18 is stowed and the cargo area 16 is lit while the panel 14 is in the open position, the intensity of the illumination source can be high or in a more intense mode. However, when the handle 18 is moved to the active mode the intensity of the illumination source 24 can be reduced or made to be less intense. For example, when the handle 18 is moved to the active position, the bright and intense illumination of the cargo area is ceased and just the handle 18 is illuminated at a lower intensity such that the handle 18 can be easily seen for closure purposes.

In one example, the illumination source 24 can switch to a third color and/or a third intensity when the closure panel 14 is in the closed position and the handle 18 is in the active mode (FIG. 5). This third color indicates to the user that the closure panel 14 is closed completely and latched as indicated by the ajar switch. In one example, the third color is green. This feature is especially important when the cargo area 16 is in the front 10 of the vehicle 12 and the panel 14 is configured to slide rearwardly. If the panel 14 is not properly latched, the panel 14 can open during driving such that objects within the cargo area 16 may be able to fly out. When the panel 14 is properly latched, the handle 18 can be pivoted to the stowed position and the illumination source 24 will turn off.

Figure 6:
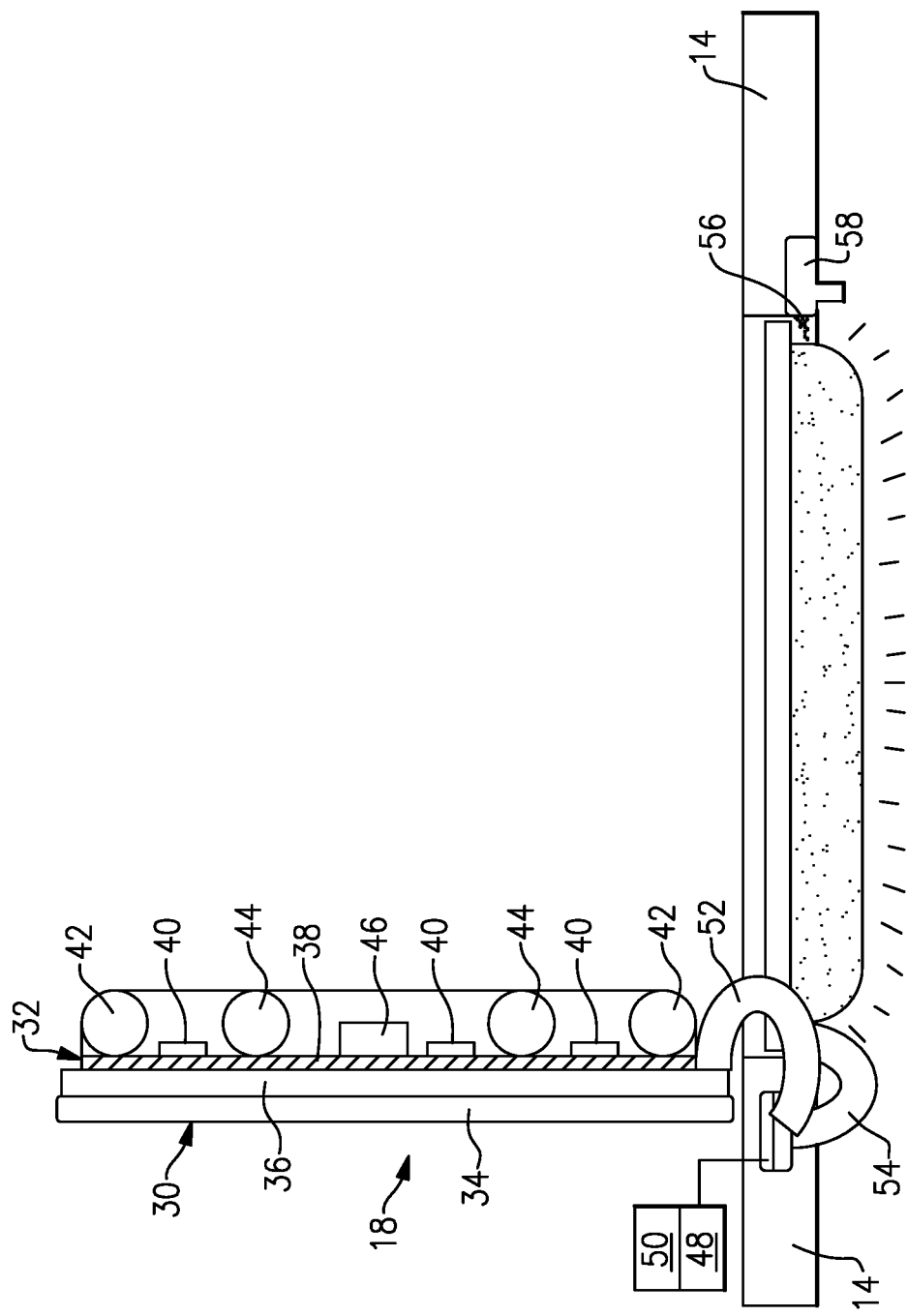
FIG. 6 is a schematic view of the handle of FIGS. 1-5 in the active position and the stowed position.

FIG. 6 is a schematic view of the handle 18 of FIGS. 1-5 in the active or raised position (to the left) and a stowed/flush position. The handle 18 has an exterior surface 30 that is flush with the vehicle closure panel 14 in the stowed mode and an interior surface 32 that supports the illumination source 24. The exterior surface 30 includes a layer 34 of body color that is the same as the surrounding area on the hood 20 and closure panel 14. In one example, a metal reinforcement layer 36 is formed as part of the handle 18. A printed circuit board (PCB) 38 is attached to the metal reinforcement layer 36 to form at least a portion of the interior surface 32 of the handle 18.

The PCB 38 supports various electronics 40 that are configured to control illumination of the illumination source 24. In one example, the illumination source 24 comprises one or more red-green-blue (RGB) light-emitting diodes (LEDs) 42 that form a lamp or light assembly. The RGB LEDs 42 can be used to produce any color light as needed. In one example, the illumination source 24 includes auxiliary high intensity white LEDs 44 that can be used for illuminating the cargo area 16.

The PCB 38 also includes an orientation sensor 46 that tells the illumination source 24 whether the handle 18 is in the stowed/flush position or whether the handle 18 is in the upright/active position. The PCB 38 with the electronics 40, orientation sensor 46, and illumination source 24 is electrically connected to a control 48 and power source 50 via a flexible wire harness 52. A hinge connection 54 couples the handle 18 to the closure panel 14. The hinge connection 54 and wiring harness 52 are routed and installed in a manner similar to that of a trunk or rear hatch lid for a vehicle.

FIG. 6 shows the handle 18 in an upright/active position with the PCB 38, electronics 40, orientation sensor 46 and LEDs 42, 44 shown schematically. FIG. 6 also shows the handle in a stowed/flush position with the high intensity white LEDs 44 activated to illuminate the cargo area 16 (FIG. 3). The handle 18 also includes a manual handle latch 56 that is activated by a user to open the closure panel 14. As discussed above, in one example, the vehicle emblem 22 is pressed to release the manual handle latch 56. The latch 56 can comprise any type of manual release component. The handle 18 also includes an ajar switch 58 to indicate whether or not the latch 56 is securely latched.

The subject invention provides a handle 18 including a multi-color, multi-function combination lid latch, cargo area light, and handle light that can indicate a latch condition. The handle 18 is a flush mount such that the handle is non-obtrusive and has an aesthetically pleasing appearance. The illumination source 24 on the handle 18 illuminates the cargo area 16 in a first color, such as white for example, when the handle 18 is in the stowed position and the closure panel 14 is open. The illumination source 24 changes to a second identifying color, red or blue for example, with a lower indicating intensity when the handle 18 is moved to the active/raised position such that the handle 18 can be used to pull the closure panel 14 forward to cover the cargo area 16. The handle 18 then changes to a third low intensity color, such as green for example, when the closure panel 14 is fully latched (as indicated by the ajar switch 58) to indicate to a user that the closure panel 14 is secured and to remind the user to move the handle 18 to the stowed position. The illumination source 24 in the latch handle 18 then turns off when the handle 18 is stowed/flush and the closure panel 14 is closed.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
   a handle moveable relative to a vehicle closure panel between an active mode and a stowed mode; and
   an illumination source incorporated into the handle, the illumination source illuminating the handle when in the active mode and illuminating a cargo area associated with the vehicle closure panel when in the stowed mode with the closure panel open.

2. The apparatus according to claim 1, wherein the illumination source illuminates a first color when in the active mode and a second color different than the first color when in the stowed mode.

3. The apparatus according to claim 2, wherein the illumination source illuminates a third color different than the first and second colors when the closure panel covers the cargo area and is properly latched.

4. The apparatus according to claim 1, wherein the illumination source has a first intensity when in the active mode and a second intensity different than the first intensity when in the stowed mode.

5. The apparatus according to claim 1, wherein the handle has an exterior surface that is flush with the vehicle closure panel in the stowed mode and an interior surface that supports the illumination source.

6. The apparatus according to claim 5, including a printed circuit board mounted to the interior surface and electrically connected to the illumination source.

7. The apparatus according to claim 6, wherein the printed circuit board includes an orientation sensor communicating with the illumination source to change at least one of color or intensity of the illumination source for the stowed and active modes.

8. The apparatus according to claim 6, including a hinge connection that couples the handle to the vehicle closure panel, the hinge connection including electrical connections to couple the printed circuit board to a power source.

9. The apparatus according to claim 1, wherein the vehicle closure panel has a panel exterior surface facing outwardly of a vehicle and wherein an exterior handle surface is flush with the panel exterior surface when in the stowed mode.

10. The apparatus according to claim 9 wherein the exterior handle surface includes a layer of body color that matches a body color of a surrounding area of the panel exterior surface.

11. The apparatus according to claim 1, wherein the handle is fixed to the vehicle closure panel via a hinge connection such that the handle can move relative to the vehicle closure panel between the active and stowed mode.

12. The apparatus according to claim 1, wherein the handle is fixed to the vehicle closure panel and wherein the illumination source is fixed to an interior surface of the handle for movement with the handle.

13. An apparatus, comprising:
a vehicle closure panel moveable between an open position to provide access to a cargo area and a closed position to cover the cargo area;
a handle moveable relative to the vehicle closure panel between an active mode and a stowed mode; and
an illumination source incorporated into the handle and illuminating the handle when in the active mode and illuminating the cargo area when in the stowed mode with the closure panel open.

14. The apparatus according to claim 13, wherein the handle is flush with the vehicle closure panel when in the stowed mode and is pivoted upwardly relative to the vehicle closure panel when in the active mode.

15. The apparatus according to claim 14, wherein the illumination source illuminates a first color when the closure panel is in the open position the handle is in the stowed mode, and wherein the illumination source illuminates a second color when the closure panel is in the open position and the handle is in the active mode.

16. The apparatus according to claim 15, wherein the illumination source has a first intensity when in the stowed mode and a second intensity lower than the first intensity when in the active mode.

17. The apparatus according to claim 15, wherein the illumination source illuminates a third color when the closure panel is in the closed position and the handle is in the active mode.

18. The apparatus according to claim 14, wherein the handle has an exterior surface that is flush with the vehicle closure panel in the stowed mode and an interior surface that supports the illumination source.

19. The apparatus according to claim 18, including a printed circuit board mounted to the interior surface and electrically connected to the illumination source, and an orientation sensor communicating with the illumination source to change at least one of color or intensity of the illumination source for the stowed and active modes.

20. The apparatus according to claim 13, wherein the vehicle closure panel has a panel exterior surface facing outwardly of a vehicle and wherein an exterior handle surface is flush with the panel exterior surface when in the stowed mode.

21. The apparatus according to claim 20 wherein the exterior handle surface includes a layer of body color that matches a body color of a surrounding area of the panel exterior surface.

22. The apparatus according to claim 13, wherein the handle is fixed to the vehicle closure panel via a hinge connection such that the handle can move relative to the vehicle closure panel between the active and stowed mode.

23. The apparatus according to claim 13, wherein the handle is fixed to the vehicle closure panel and wherein the illumination source is fixed to an interior surface of the handle for movement with the handle.

* * * * *